F. LANGFORD.
PROCESS FOR PRODUCING ALUMINUM COMPOUNDS.
APPLICATION FILED AUG. 5, 1916.
1,249,125.
Patented Dec. 4, 1917.
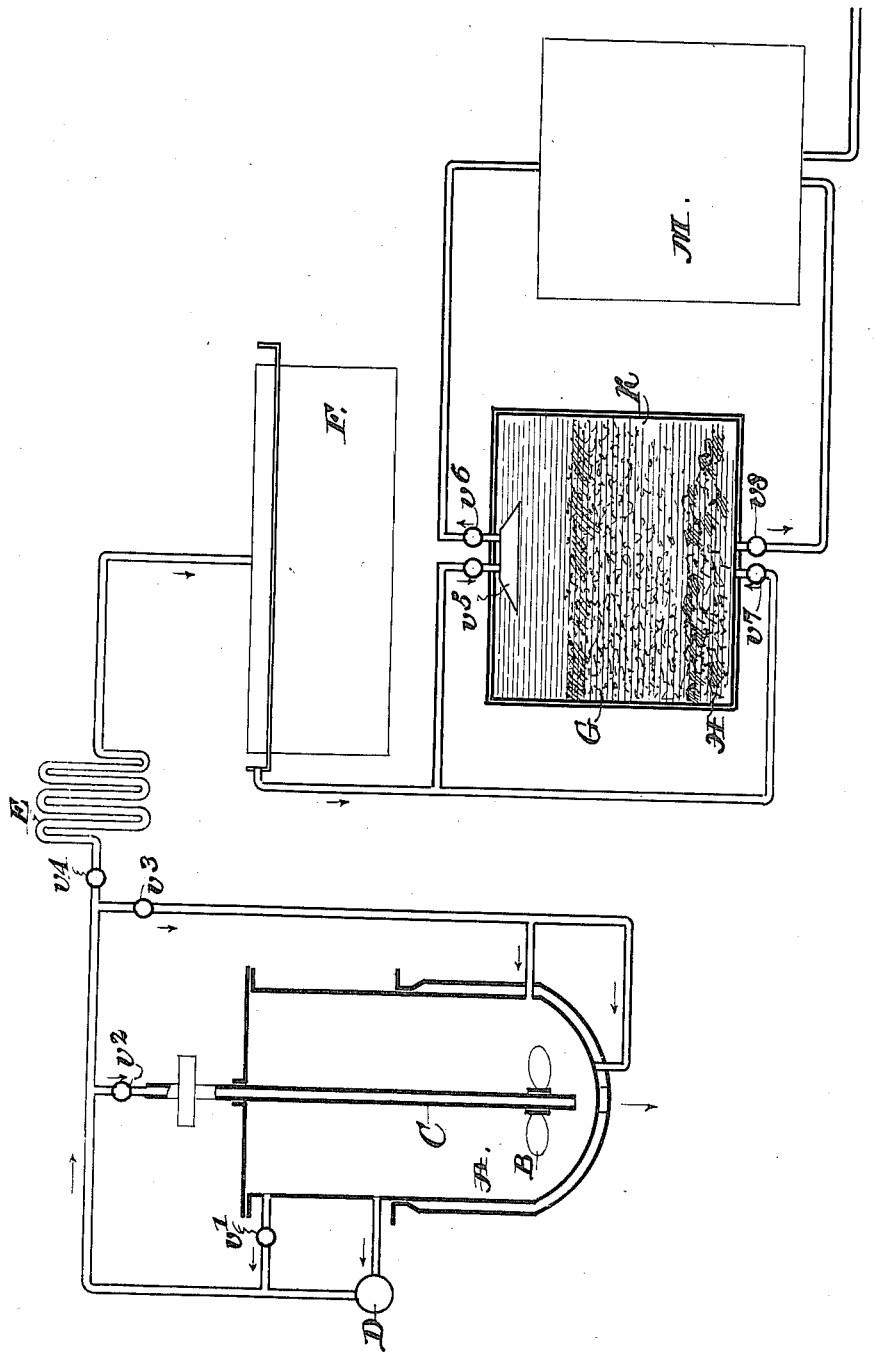
WITNESS
John S. Schrott
INVENTOR
Frank Langford
BY
ATTORNEYS

UNITED STATES PATENT OFFICE.

FRANK LANGFORD, OF EUREKA, CALIFORNIA.

PROCESS FOR PRODUCING ALUMINUM COMPOUNDS.

1,249,125.  Specification of Letters Patent.  Patented Dec. 4, 1917.

Application filed August 5, 1916. Serial No. 113,280.

*To all whom it may concern:*

Be it known that I, FRANK LANGFORD, a citizen of the United States, and a resident of Eureka, in the county of Humboldt and State of California, have invented a certain new and useful Improvement in Processes for Producing Aluminum Compounds; and it consists in the steps as set forth.

An object of my invention is to provide a process by means of which aluminum compounds may be economically produced from aluminum ores.

A further object of my invention is to provide a process for producing cheaply pure compounds of aluminum.

A further object of my invention is to provide a process for producing compounds of aluminum such as aluminum oxid from ores that are not commonly used for that purpose.

A further object of my invention is to provide a process for producing compounds of aluminum, in which a porous floating filter consisting of raw cellulose fiber, such as the pulp from the redwood tree is used, and in which the tannin or tannic acid, or part of it, is removed during the process, while the fiber accumulates certain matters which are given up by the compounds, which tend to enhance the value of the compounds and the value of the wood-pulp for certain purposes, as for instance, building board, for lining paper, for fire resisting paper, and for various wood pulp products.

A further object of my invention is to provide a process for producing pure sulfur oxids and pure silica sand, and improved wood pulp from tannin bearing woods and fiber, as by-products in the herein described process of producing purified aluminum compounds, in which a floating porous filter consisting of cellulose fiber mixed with tannic acid, such as the pulp or comminuted wood and bark of the redwood tree, is used, and in which a part of the tannin or tannic acids and other impurities of the wood or fiber are removed during the process, which removal is beneficial to the fiber for its subsequent use; the tannin and other impurities so removed becoming active chemically and mechanically in removing the impurities from the aluminum sulfate solutions and from the alumina to be produced therefrom by evaporating and roasting said aluminum sulfate.

Other objects and advantages will appear in the following specifications and the novel features of the invention will be particularly pointed out in the appended claims.

My invention is illustrated in the accompanying drawings, forming a part of this application, and in which:

The figure is a diagrammatical view of one type of apparatus which may be used in carrying out the process.

The ores which form the raw materials to be treated may be bauxite, aluminum sulfate, alunite, aluminum silicates, aluminous sulfid ores, or other ores. The process is particularly adapted to the laterite ores of aluminum, which appear to be mixtures of aluminum oxids, hydroxids and silicates, and containing impurities which are soluble in sulfurous acid such as iron, manganese and lime, and certain compounds and minerals which are not soluble in sulfurous acid, the compounds of aluminum contained becoming easily and quickly soluble in dilute sulfuric acid by my process.

In carrying out the process I first treat the crude ore, without previous calcining, with sulfurous acid solution, produced from any sulfur bearing ores the fumes from which would destroy vegetation if discharged into the atmosphere direct. This treatment is for the purpose of eliminating the sulfur oxids from such gases and at the same time to combine them with impurities in the aluminum ores such as iron minerals, compounds of calcium, magnesium, sodium, potassium, or other soluble impurities, and is carried out by passing said gases or solutions through the ores in the herein described filter tank or other suitable apparatus. These sulfite solutions may then be used in the treatment of wood pulp, or they may be used for soil treatment, as by-products, or they may be discharged to waste.

The remaining aluminum ore and silica, purified and rendered more soluble as to its aluminum compounds by this preliminary treatment, or crude ore if sufficiently pure and soluble, is now treated with dilute sulfuric acid, heated, and without previous calcination, for the separation of the aluminum compounds from the silica and other impurities. This is done by leaching or agitation with sulfuric acids. In this operation it is preferable to use the gases produced in calcining the aluminum sulfate produced by treatment of a previous quantity or batch of ore, similarly purified, for the production of alumina which is one of the objects and steps in this process.

The solutions from the dilute sulfuric acid treatment and containing the aluminum compounds are now passed through a filter tank containing redwood pulp, or other cellulose fiber which has tannin or tannic acid; wherein I have found that the tannin or tannic acid is partly removed and that the filter besides acting mechanically on the solutions acts chemically on them so as to aid in the separation of the aluminum compounds from the impurities, such as iron and silica. In addition certain substances are taken up by the wood pulp or cellulose fiber, which are beneficial to it as a filtering medium for acid solutions and for the production of certain wood pulp products, such as silica in colloidal form and aluminum sulfate.

In addition to the filtering medium which is composed of the fiber of the redwood, or other suitable fiber, I may use porous aluminum ores from which part of the aluminum compounds will be dissolved.

In the illustrative drawings I have indicated diagrammatically a digester A in which the ore is placed. The solution in the tank A is heated preferably by steam and is further kept in agitation preferably by means of a stirring device B which is mounted on a pipe shaft C through which the solutions or sulfurous gases or air or wash water or tannin or tannic acid, as may be necessary, may be introduced and circulated. At D I have shown a circulating device such as a pump or other similar device. A cooling coil E is disposed between the digester and a settling tank F. The filter tank G is provided at its bottom with a layer of bauxite or laterite filtering material, while above this is the fibrous pulp K. Above the floating, acid resisting, fibrous pulp K is a vacuum box or strainer.

The solutions may be circulated through the digester by means of the pump D through the manipulation of the valves $v^1$, $v^2$, $v^3$, and $v^4$, or other suitable arrangement. By opening the valve $v^4$ and closing certain of the other valves the liquid is transferred through the cooler to the settling tank, or the cooling coil may be omitted or may be used as a heating coil, as may be from time to time necessary on varying combinations of ore, acids and filtering mediums. From the settling tank the solutions go to the filter. In the arrangement shown in the drawing, the solutions may be passed either way through the filter, that is from the top to the bottom or from the bottom to the top. The solutions are drawn from the filter tank G into the tank M which may be a filter similar to G, or may be an evaporator in which the heat for evaporating purposes is directed through a jet or burners directly upon the surface or near the surface of the solution in this tank or container, or may be transmitted through metal coils or tubes as is common for such purposes.

I claim:

1. The herein described process of producing aluminum compounds from ores of aluminum which consists in treating the crude ore with sulfurous acid, leaching the ore, treating the residue with dilute sulfuric acid, leaching, filtering the solutions thus obtained through a filter comprising a floating mass of the fiber of tannin bearing wood, whereby tannin is abstracted from the fiber, and portions of the solutions and portions of the suspended matter therein are precipitated on the filter.

2. The herein described process of producing aluminum compounds from ores of aluminum, which consists in treating the crude ore with sulfurous acid, leaching the ore, treating the residue with dilute sulfuric acid, leaching, filtering the solutions thus obtained through a filter comprising a floating mass of the fiber of the redwood tree, whereby tannin is abstracted from the fiber, and portions of the solutions and portions of the suspended matter therein are precipitated on the filter.

3. The herein described process of producing alumina from ores of aluminum, which consists in treating the crude ore with sulfurous acid, leaching the ore, treating the residue with dilute sulfuric acid, leaching, filtering the solutions thus obtained through a filter comprising a floating mass of the fiber of the redwood tree, whereby tannin is abstracted from the fiber, and portions of the solutions and portions of the suspended matter therein are precipitated on the filter, evaporating the solution, and calcining the residue.

FRANK LANGFORD.

Witnesses:
  Ira M. Long,
  Cecile Langford.